United States Patent
Xie

(10) Patent No.: US 10,414,663 B2
(45) Date of Patent: Sep. 17, 2019

(54) SYNTHESIS OF SFE FRAMEWORK TYPE MOLECULAR SIEVES

(71) Applicant: Chevron U.S.A. Inc., San Ramon, CA (US)

(72) Inventor: Dan Xie, Richmond, CA (US)

(73) Assignee: Chevron U.S.A. Inc., San Ramon ( * ) Notice: Subject to any disclaimer, the term of this patent is extended or adjusted under 35 U.S.C. 154(b) by 0 days.

(21) Appl. No.: 15/996,610

(22) Filed: Jun. 4, 2018

(65) Prior Publication Data

US 2018/0346340 A1 Dec. 6, 2018

Related U.S. Application Data

(60) Provisional application No. 62/515,047, filed on Jun. 5, 2017.

(51) Int. Cl.

| | |
|---|---|
| *B01J 29/86* | (2006.01) |
| *B01J 29/87* | (2006.01) |
| *B01J 29/88* | (2006.01) |
| *B01J 29/70* | (2006.01) |
| *C01B 39/48* | (2006.01) |
| *C01B 37/00* | (2006.01) |
| *B01J 37/04* | (2006.01) |
| *B01J 37/10* | (2006.01) |
| *B01J 37/00* | (2006.01) |
| *C01B 39/08* | (2006.01) |
| *C01B 39/12* | (2006.01) |

(52) U.S. Cl.
CPC ............. *C01B 37/007* (2013.01); *B01J 29/70* (2013.01); *B01J 29/86* (2013.01); *B01J 29/87* (2013.01); *B01J 29/88* (2013.01); *B01J 37/0018* (2013.01); *B01J 37/04* (2013.01); *B01J 37/10* (2013.01); *C01B 39/08* (2013.01); *C01B 39/12* (2013.01); *C01B 39/48* (2013.01)

(58) Field of Classification Search
CPC ....... C01B 37/007; C01B 39/08; C01B 39/12; C01B 39/48; B01J 29/86; B01J 29/87; B01J 29/88; B01J 29/70

See application file for complete search history.

(56) References Cited

U.S. PATENT DOCUMENTS

| | | |
|---|---|---|
| 6,080,382 A | 6/2000 | Lee et al. |
| 2002/0085976 A1 | 7/2002 | Elomari |
| 2015/0110712 A1 | 4/2015 | Schmidt et al. |
| 2015/0202603 A1 | 7/2015 | Schmidt et al. |
| 2018/0346340 A1* | 12/2018 | Xie ...................... C01B 37/007 |

OTHER PUBLICATIONS

P. Wagner, O. Terasaki, S. Ritsch, J.G. Nery, S.I. Zones, M.E. Davis and K. Hiraga "Electron Diffraction Structure Solution of a Nanocrystalline Zeolite at Atomic Resolution" J. Phys. Chem. B 1999, 103, 8245-8250.

(Continued)

*Primary Examiner* — David M Brunsman
(74) *Attorney, Agent, or Firm* — Terrence M. Flaherty

(57) ABSTRACT

A method is provided for synthesizing a molecular sieve of SFE framework type using a structure directed agent selected from one or more of 1,2,3,5-tetramethyl-1H-pyrazol-2-ium cations and 1,2,3,4-tetramethyl-1H-imidazol-3-ium cations.

12 Claims, 2 Drawing Sheets

Two-Theta (deg)

(56) References Cited

OTHER PUBLICATIONS

J.G. Nery, S-J. Hwang and M.E. Davis "On the synthesis of SSZ-48, SSZ-43 and their variations" Micropor. Mesopor. Mater. 2002, 52, 19-28.
G.S. Lee, Y. Nakagawa, S-J. Hwang, M.E. Davis, P. Wagner, L. Beck and S.I. Zones "Organocations in Zeolite Synthesis: Fused Bicyclo [l.m.0] Cations and the Discovery of Zeolite SSZ-48" J. Am. Chem. Soc. 2002, 124, 7024-7034.
PCT International Search Report, International Patent Appl. No. PCT/IB2018/053980, dated Sep. 10, 2018.

* cited by examiner

SYNTHESIS OF SFE FRAMEWORK TYPE MOLECULAR SIEVES

CROSS-REFERENCE TO RELATED APPLICATIONS

This application claims priority to U.S. Provisional Application Ser. No. 62/515,047 filed Jun. 5, 2017, which is herein incorporated by reference in its entirety.

TECHNICAL FIELD

This disclosure relates to the synthesis of crystalline molecular sieves of SFE framework type, such as SSZ-48.

BACKGROUND

SSZ-48 is a crystalline molecular sieve material having a unique one-dimensional 12-membered ring pore system. The framework structure of SSZ-48 has been assigned the three-letter code SFE by the Structure Commission of the International Zeolite Association.

The composition and characterizing X-ray diffraction pattern of SSZ-48 are disclosed in U.S. Pat. No. 6,080,382, which also describes the preparation of the molecular sieve using a decahydroquinolinium cation as a structure directing agent.

The commercial development of SSZ-48 has been hindered by the high cost of the decahydroquinolinium cation structure directing agent required in U.S. Pat. No. 6,080,382 for its synthesis and hence there has been significant interest in finding alternative, less expensive structure directing agents for the synthesis of SSZ-48.

According to the present disclosure, it has now been found the cations described herein are effective as structure directing agents in the synthesis of SSZ-48.

SUMMARY

In one aspect, there is provided a method of synthesizing a molecular sieve of SFE framework type, the method comprising: (a) preparing a reaction mixture comprising: (1) a source of silicon oxide; (2) a source of an oxide of a trivalent element (X); (3) optionally, a source of a Group 1 or Group 2 metal (M); (4) a structure directing agent (Q) comprising one or more of 1,2,3,5-tetramethyl-1H-pyrazol-2-ium cations and 1,2,3,4-tetramethyl-1H-imidazol-3-ium cations; (5) hydroxide ions; and (6) water; and (b) subjecting the reaction mixture to crystallization conditions sufficient to form crystals of the molecular sieve.

In another aspect, there is provided a molecular sieve of SFE framework type and, in its as-synthesized form, comprising one or more of 1,2,3,5-tetramethyl-1H-pyrazol-2-ium cations and 1,2,3,4-tetramethyl-1H-imidazol-3-ium cations in its pores.

The molecular sieve has, in its as-synthesized and anhydrous form, a chemical composition comprising the following molar relationship:

|          | Broad       | Exemplary   |
|----------|-------------|-------------|
| $SiO_2/X_2O_3$ | 20 to 300   | 100 to 200  |
| $Q/SiO_2$ | >0 to 0.1   | >0 to 0.1   |
| $M/SiO_2$ | 0 to 0.1    | >0 to 0.1   | wherein X is a trivalent element (e.g., one or more of boron, aluminum, gallium, and iron); Q comprises one or more of 1,2,3,5-tetramethyl-1H-pyrazol-2-ium cations and 1,2,3,4-tetramethyl-1H-imidazol-3-ium cations; and M is a Group 1 or Group 2 metal.

DETAILED DESCRIPTION

Introduction

Figure 1:
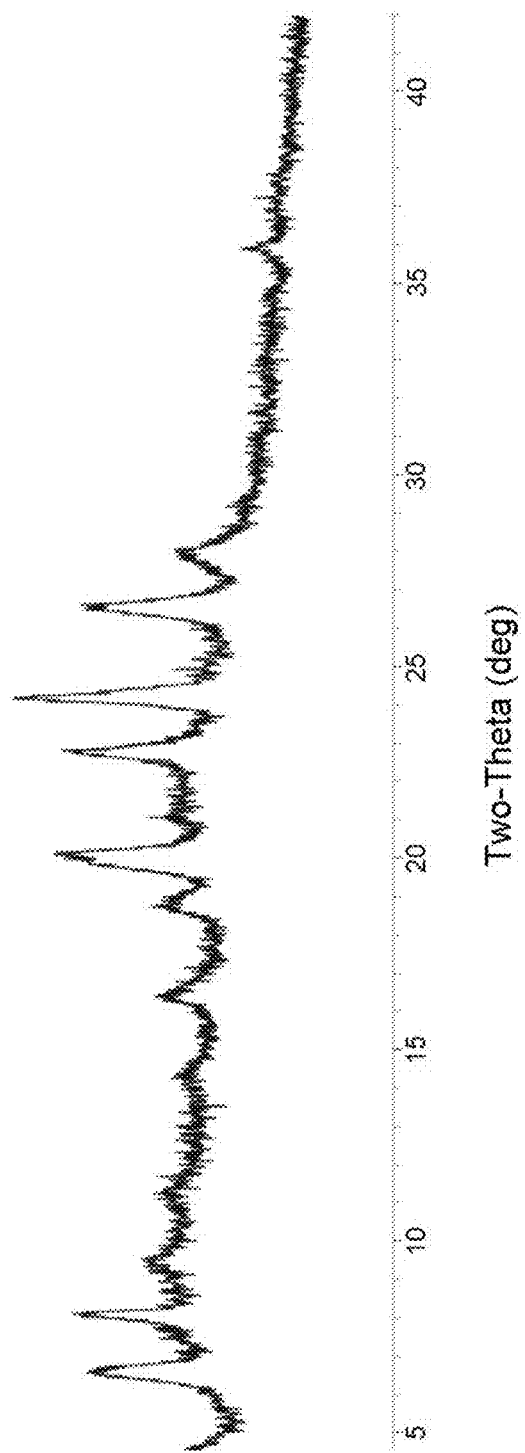
FIG. 1 is a powder X-ray diffraction (XRD) pattern of the as-synthesized molecular sieve prepared in Example 1.

The term "framework type" is used in the sense described in the "*Atlas of Zeolite Framework Types*," Sixth Revised Edition, Elsevier (2007).

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, the present molecular sieve is synthesized by: (a) preparing a reaction mixture comprising: (1) a source of silicon oxide; (2) a source of an oxide of a trivalent element (X); (3) optionally, a source of a Group 1 or Group 2 metal (M); (4) a structure directing agent (Q) selected from one or more of 1,2,3,5-tetramethyl-1H-pyrazol-2-ium cations and 1,2,3,4-tetramethyl-1H-imidazol-3-ium cations; (5) hydroxide ions; and (6) water; and (b) subjecting the reaction mixture to crystallization conditions sufficient to form crystals of the molecular sieve.

The composition of the reaction mixture from which the molecular sieve is formed, in terms of molar ratios, is identified in Table 1 below:

TABLE 1

| Reactants   | Useful       | Exemplary    |
|-------------|--------------|--------------|
| $SiO_2/X_2O_3$ | 5 to 400     | 150 to 250   |
| $M/SiO_2$   | 0 to 0.50    | 0.10 to 0.30 |
| $Q/SiO_2$   | 0.05 to 0.50 | 0.10 to 0.30 |
| $OH/SiO_2$  | 0.10 to 0.50 | 0.15 to 0.40 |
| $H_2O/SiO_2$ | 10 to 60     | 15 to 40     | wherein compositional variables X, M and Q are as described herein above.

Suitable sources of silicon oxide include fumed silica, colloidal silica, precipitated silica, alkali metal silicates and tetraalkyl orthosilicates.

Suitable sources of trivalent element X depend on the element X that is selected (e.g., boron, aluminum, gallium and iron). In embodiments where X is boron, suitable sources of boron include boric acid, sodium tetraborate and potassium tetraborate.

Examples of suitable Group 1 or Group 2 metals (M) include sodium, potassium and calcium, with sodium being preferred. The metal is generally present in the reaction mixture as the hydroxide.

The structure directing agent (Q) comprises from one or more of 1,2,3,5-tetramethyl-1H-pyrazol-2-ium cations and 1,2,3,4-tetramethyl-1H-imidazol-3-ium cations, represented by the following structures (1) and (2), respectively:

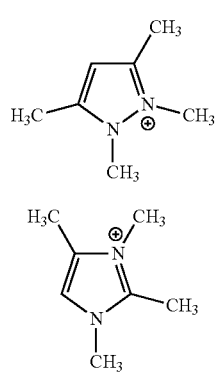

Suitable sources of Q are the hydroxides and/or salts of the relevant quaternary ammonium compounds.

The reaction mixture may also contain seeds of a crystalline material, such as SSZ-48 from a previous synthesis, desirably in an amount of from 0.01 to 10,000 ppm by weight (e.g., from 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-48 over any undesired phases.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as for example polypropylene jars or Teflon-lined or stainless steel autoclaves, at a temperature of from 125° C. to 200° C. for a time sufficient for crystallization to occur at the temperature used, e.g., from 2 to 50 days. Crystallization is usually carried out in a closed system under autogenous pressure.

Once the molecular sieve crystals have formed, the solid product is separated from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the structure directing agent used in the synthesis.

The molecular sieve described herein may be subjected to treatment to remove part or all of the structure directing agent (Q) used in its synthesis. This is conveniently effected by thermal treatment (calcination) in which the as-synthesized material is heated at a temperature of at least about 370° C. for at least 1 minute and generally not longer than 20 hours. The thermal treatment can be performed at a temperature up to 925° C. While sub-atmospheric pressure can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22).

To the extent desired, any Group 1 or 2 metal cations (e.g., $Na^+$) in the as-synthesized molecular sieve can be replaced in accordance with techniques well known in the art by ion exchange with other cations. Preferred replacing cations include metal ions (e.g., rare earth metals and metals of Groups 2 to 15 of the Periodic Table), hydrogen ions, hydrogen precursor ions (e.g., ammonium ions), and combinations thereof.

SSZ-48 containing framework aluminum may be prepared indirectly from borosilicate SSZ-48 by post-synthetic replacement of the boron in the borosilicate SSZ-48 framework with aluminum. Replacement of boron in borosilicate SSZ-48 with aluminum can be achieved by suitable treatment of borosilicate SSZ-48 with an aluminum salt (e.g., aluminum nitrate) such as described in U.S. Pat. Nos. 6,468,501 and 6,790,433. The proportion of boron in borosilicate SSZ-48 that may be replaced with aluminum may be in the range of from greater than 0 to about 100% (at least 50%, at least 75%, or from about 85% to 100%).

SSZ-48 can be formulated into a catalyst composition by combination with other materials, such as binders and/or matrix materials, which provide additional hardness or catalytic activity to the finished catalyst. When blended with such components, the relative proportions of SSZ-48 and matrix may vary widely with the SSZ-48 content ranging from 1 to 90 wt. % (e.g., from 2 to 80 wt. %) of the total catalyst.

Characterization of the Molecular Sieve

In its as-synthesized and anhydrous form, the present molecular sieve has chemical composition comprising the following molar relationship:

|  | Broad | Exemplary |
|---|---|---|
| $SiO_2/X_2O_3$ | 20 to 300 | 100 to 200 |
| $Q/SiO_2$ | >0 to 0.1 | >0 to 0.1 |
| $M/SiO_2$ | 0 to 0.1 | >0 to 0.1 | wherein X is a trivalent element (e.g., one or more of boron, aluminum, gallium, and iron); Q is selected from one or more of 1,2,3,5-tetramethyl-1H-pyrazol-2-ium cations and 1,2,3,4-tetramethyl-1H-imidazol-3-ium cations; and M is a Group 1 or Group 2 metal.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

As taught by U.S. Pat. No. 6,080,382, molecular sieve SSZ-48 has an X-ray diffraction pattern which, in its as-synthesized form, includes at least the peaks set forth in Table 2 below and which, in its calcined form, includes at least the peaks set forth in Table 3.

TABLE 2

Characteristic Peaks for As-Synthesized SSZ-48

| 2-Theta[a] | d-spacing, nm | Relative Intensity[b] |
|---|---|---|
| 6.55 | 1.35 | S |
| 8.0 | 1.10 | VS |
| 9.4 | 0.940 | M |
| 11.3 | 0.782 | M-W |
| 20.05 | 0.442 | VS |
| 22.7 | 0.391 | VS |
| 24.1 | 0.369 | VS |
| 26.5 | 0.336 | S |
| 27.9 | 0.320 | S |
| 35.85 | 0.250 | M |

[a] ±0.3
[b] The powder XRD patterns provided are based on a relative intensity scale in which the strongest line in the XRD pattern is assigned a value of 100:
W = weak (>0 to ≤20); M = medium (>20 to ≤40); S = strong (>40 to ≤60); VS = very strong (>60 to ≤100).

TABLE 3

Characteristic Peaks for Calcined SSZ-48

| 2-Theta[a] | d-spacing, nm | Relative Intensity[b] |
|---|---|---|
| 6.55 | 1.35 | VS |
| 8.0 | 1.10 | VS |
| 9.4 | 0.940 | S |
| 11.3 | 0.782 | M |
| 20.05 | 0.442 | M |
| 22.7 | 0.391 | M |
| 24.1 | 0.369 | M |
| 26.5 | 0.336 | M |
| 27.9 | 0.320 | W |
| 35.85 | 0.250 | W |

[a] ±0.3
[b] The powder XRD patterns provided are based on a relative intensity scale in which the strongest line in the XRD pattern is assigned a value of 100:
W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following illustrative examples are intended to be non-limiting.

Example 1

19.55 g of deionized water, 0.40 g of a 50% NaOH solution, 13.51 g of a 13.14% 1,2,3,5-tetramethyl-1H-pyrazol-2-ium hydroxide solution, 0.03 g of boric acid and 3.00 g of CAB-O-SIL® M-5 fumed silica (Cabot Corporation) were mixed together in a Teflon liner. The resulting gel was stirred until it became homogeneous. The liner was then capped and placed within a Parr steel autoclave reactor. The autoclave was then put in an oven and heated at 150° C. for 35 days with tumbling (43 rpm). The solid products were recovered from the cooled reactor by centrifugation, washed with deionized water and dried at 95° C.

Figure 2:
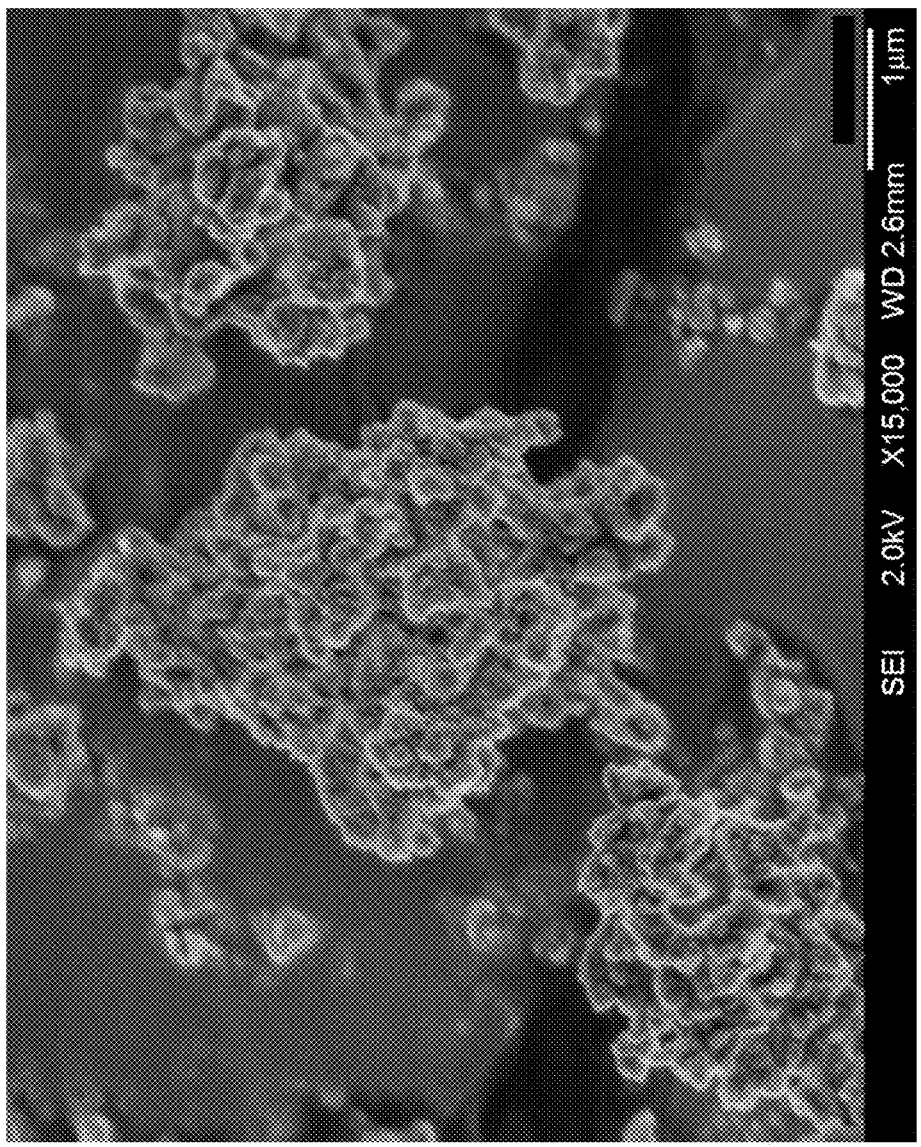
FIG. 2 is a Scanning Electron Micrograph (SEM) image of the as-synthesized molecular sieve prepared in Example 1.

The resulting product was analyzed by powder XRD and SEM. The powder XRD pattern of the product is shown FIG. 1 and is consistent with the product being SSZ-48. A SEM image of the product is shown in FIG. 2 and indicates a uniform field of crystals.

The product had a $SiO_2/B_2O_3$ molar ratio of 155.9, as determined by ICP elemental analysis.

Example 2

59.11 g of deionized water, 1.07 g of a 50% NaOH solution, 29.04 g of a 16.30% 1,2,3,4-tetramethyl-1H-imidazol-3-ium hydroxide solution, 0.08 g of boric acid and 8.00 g of CAB-O-SIL® M-5 fumed silica (Cabot Corporation) were mixed together in a Teflon liner. The resulting gel was stirred until it became homogeneous. The liner was then capped and placed within a Parr steel autoclave reactor. The autoclave was then put in an oven and heated at 150° C. for 31 days with tumbling (43 rpm). The solid products were recovered from the cooled reactor by centrifugation, washed with deionized water and dried at 95° C.

The resulting product was analyzed by powder XRD and shown to be SSZ-48.

The product had a $SiO_2/B_2O_3$ molar ratio of 154.1, as determined by ICP elemental analysis.

Example 3

Example 1 was repeated with the exception that 5 wt. % of seed crystals of borosilicate SSZ-48 from a previous synthesis were added to the reaction mixture. The crystallization of SSZ-48 was complete in 6 days, as confirmed by powder XRD.

Example 4

Example 2 was repeated with the exception that 5 wt. % of seed crystals of borosilicate SSZ-48 from a previous synthesis were added to the reaction mixture. The crystallization of SSZ-48 was complete in 6 days, as confirmed by powder XRD.

Example 5

4.42 g of deionized water, 3.24 g of a 13.14% 1,2,3,5-tetramethyl-1H-pyrazol-2-ium hydroxide solution, 0.19 g of boric acid, 3.00 g of LUDOX® AS-30 colloidal silica, and 0.16 g of a 33.5% HCl solution, were mixed together in a Teflon liner. The resulting gel was stirred until it became homogeneous. The liner was then capped and placed within a Parr steel autoclave reactor. The autoclave was then put in an oven and heated at 160° C. for 50 days with tumbling (43 rpm). The solid products were recovered from the cooled reactor by centrifugation, washed with deionized water and dried at 95° C.

The resulting product was analyzed by powder XRD and shown to be SSZ-48.

The product had a $SiO_2/B_2O_3$ molar ratio of 31.4, as determined by ICP elemental analysis.

Example 6

Example 5 was repeated with the exception that 5 wt. % of seed crystals of borosilicate SSZ-48 from a previous synthesis were added to the reaction mixture. The crystallization of SSZ-48 was complete in 14 days, as confirmed by powder XRD.

Example 7

The as-synthesized molecular sieve of Example 1 was calcined inside a muffle furnace under a flow of a mixture of nitrogen and air heated to 540° C. at a rate of 1° C./minute and held at 540° C. for 5 hours, cooled and analyzed by powder XRD.

The powder XRD pattern indicated that the material remains stable after calcination to remove the organic matter.

The calcined sample was subjected to micropore volume analysis using $N_2$ as adsorbate and via the B.E.T. method. The molecular sieve exhibited a micropore volume of 0.16 $cm^3/g$.

The invention claimed is:

1. A method of synthesizing a molecular sieve of SFE framework type, the method comprising:
   (a) preparing a reaction mixture comprising:
      (1) a source of silicon oxide;
      (2) a source of an oxide of a trivalent element (X);
      (3) optionally, a source of a Group 1 or Group 2 metal (M);
      (4) a structure directing agent (Q) comprising one or more of 1,2,3,5-tetramethyl-1H-pyrazol-2-ium cations and 1,2,3,4-tetramethyl-1H-imidazol-3-ium cations;
      (5) hydroxide ions; and
      (6) water; and
   (b) subjecting the reaction mixture to crystallization conditions sufficient to form crystals of the molecular sieve.

2. The method of claim 1, wherein the reaction mixture has a composition, in terms of molar ratios, as follows:

| | |
|---|---|
| $SiO_2/X_2O_3$ | 5 to 400 |
| $M/SiO_2$ | 0 to 0.50 |
| $Q/SiO_2$ | 0.05 to 0.50 |
| $OH/SiO_2$ | 0.10 to 0.50 |
| $H_2O/SiO_2$ | 10 to 60. |

3. The method of claim 1, wherein the reaction mixture has a composition, in terms of molar ratios, as follows:

| | |
|---|---|
| $SiO_2/X_2O_3$ | 150 to 250 |
| $M/SiO_2$ | 0.10 to 0.30 |
| $Q/SiO_2$ | 0.10 to 0.30 |
| $OH/SiO_2$ | 0.15 to 0.40 |
| $H_2O/SiO_2$ | 15 to 40. |

4. The method of claim 1, wherein the trivalent element X is selected from one or more of boron, aluminum, gallium, and iron.

5. The method of claim 1, wherein the trivalent element X comprises boron.

6. The method of claim 1, wherein the reaction mixture also contains seeds.

7. The method of claim 6, wherein the reaction mixture comprises from 0.01 to 10,000 ppm by weight of seeds.

8. The method of claim 6, wherein the seeds comprise a crystalline material of SFE framework type.

9. The method of claim 1, wherein the crystallization conditions include a temperature of from 125° C. to 200° C.

10. A molecular sieve of SFE framework type and, in its as-synthesized form, comprising one or more of 1,2,3,5-tetramethyl-1H-pyrazol-2-ium cations and 1,2,3,4-tetramethyl-1H-imidazol-3-ium cations in its pores.

11. The molecular sieve of claim 10, and having a $SiO_2/X_2O_3$ molar ratio of 20 to 300, wherein X is selected from one or more of boron, aluminum, gallium, and iron.

12. The molecular sieve of claim 11, wherein X comprises boron.

* * * * *